(12) United States Patent
Tabbara et al.

(10) Patent No.: US 8,108,502 B2
(45) Date of Patent: Jan. 31, 2012

(54) STORAGE DEVICE FOR USE IN A SHARED COMMUNITY STORAGE NETWORK

(75) Inventors: Bassam Tabbara, Seattle, WA (US); Praerit Garg, Seattle, WA (US)

(73) Assignee: Symform, Inc., Seattle, WA (US)

( * ) Notice: Subject to any disclaimer, the term of this patent is extended or adjusted under 35 U.S.C. 154(b) by 684 days.

(21) Appl. No.: 12/179,539

(22) Filed: Jul. 24, 2008

(65) Prior Publication Data

US 2010/0023722 A1 Jan. 28, 2010

(51) Int. Cl.
*G06F 12/00* (2006.01)

(52) U.S. Cl. .......................... 709/223; 709/226; 709/203

(58) Field of Classification Search .................. 709/223, 709/213, 224, 244, 203, 204, 226
See application file for complete search history.

(56) References Cited

U.S. PATENT DOCUMENTS

| | | | |
|---|---|---|---|
| 6,957,433 B2 | 10/2005 | Umberger et al. | |
| 7,379,978 B2 | 5/2008 | Anderson et al. | |
| 7,499,980 B2 * | 3/2009 | Gusler et al. | 709/214 |
| 7,596,570 B1 | 9/2009 | Emigh et al. | |
| 7,631,023 B1 | 12/2009 | Kaiser et al. | |
| 7,707,248 B2 * | 4/2010 | Simard et al. | 709/204 |
| 2003/0046396 A1 | 3/2003 | Richter et al. | |
| 2004/0230795 A1 | 11/2004 | Armitano et al. | |
| 2005/0027718 A1* | 2/2005 | Sakaguchi et al. | 707/100 |
| 2005/0138181 A1* | 6/2005 | Gallet et al. | 709/228 |
| 2006/0041619 A1 | 2/2006 | Gusler et al. | |
| 2007/0091809 A1 | 4/2007 | Smith | |
| 2007/0133554 A1 | 6/2007 | Ederer et al. | |
| 2007/0143827 A1* | 6/2007 | Nicodemus et al. | 726/2 |
| 2007/0156842 A1 | 7/2007 | Vermeulen et al. | |
| 2008/0126357 A1 | 5/2008 | Casanova et al. | |
| 2008/0147821 A1* | 6/2008 | Dietrich et al. | 709/216 |
| 2009/0216770 A1 | 8/2009 | Shrinivasan et al. | |
| 2009/0254572 A1 | 10/2009 | Redlich et al. | |
| 2010/0020718 A1 | 1/2010 | Tabbara et al. | |

OTHER PUBLICATIONS

International Search Report and Written Opinion, International Application No. PCT/US2009/051754, Applicant: Symform et al., mailed Mar. 2, 2010, 11 pages.

Laliberte, Bob. "Nirvanix Helps Accelerate Web 2.0 and Online Backup Applications Using B2B Approach," ESG Enterprise Strategy Group—Storage Infrastructure Brief. Sep. 2007. 4 pages.

* cited by examiner

*Primary Examiner* — Wing Chan
*Assistant Examiner* — Ruolei Zong
(74) *Attorney, Agent, or Firm* — Perkins Coie LLP

(57) ABSTRACT

A storage device configured to join a shared community storage network. All or a portion of the storage device is registered with the community storage network as a storage node. Once registered with the network, third party data may be stored on the storage node and remotely accessed by third parties. In addition, data stored on the storage device by a user may be stored in the shared community storage network by encrypting the data, adding redundancy, and distributing it to other storage nodes within the storage network. Data that is stored in the storage network is accessible to the user even if their storage device is inaccessible or fails. The user may receive economic or non-economic incentives for allowing the storage device to join the shared community storage network.

31 Claims, 10 Drawing Sheets

STORAGE DEVICE FOR USE IN A SHARED COMMUNITY STORAGE NETWORK

RELATED APPLICATIONS

This application is related to U.S. patent Ser. No. 12/977,426, filed concurrently herewith, entitled "SHARED COMMUNITY STORAGE NETWORK".

BACKGROUND

Consumers generate and maintain large volumes of valuable data on their personal computers (PCs). This data, for example, may include music collections, reports and other publications, financial documents such as taxes and bank statements, videos and/or images that capture important memories, such as family vacations, birthdays, or graduations, databases of collections, and other data that would be difficult to replicate if lost. However, PCs can only hold so much data—and when consumers store their data on a PC, they run the risk of losing everything if, for example, the hard drive of their PC crashes or if portions become corrupted. Multiple PCs are becoming the norm in homes or in small offices, which drives the need to efficiently share and protect data across multiple computers without having to constantly copy the data between machines. Furthermore, with dramatic growth of Internet usage, there is a growing desire to share stored data with friends, family members or colleagues across the globe. Similarly, the growth of mobile computing devices such as PDAs and laptops are driving the need for ubiquitous access to data without having to constantly carry it. As a result, storage is no longer an afterthought for many consumers; instead, it is a priority. In fact, consumers are searching for more ways to efficiently and securely manage their data, and to make such data accessible from anywhere and to anyone. This trend is propelling the move of storage into the network and, importantly, increasing consumers' attraction to storage service providers. A Storage Service Provider (SSP) is a company that provides data storage space and related management services (e.g., periodic backup and archiving, secure sharing, etc.).

To provide data storage services, Storage Service Providers (SSPs) typically utilize a variety of storage systems that are maintained in one or more centralized Data Center facilities. For example, data may be stored on Directly Attached Storage (DAS), Network Attached Storage (NAS), a Storage Area Network (SAN), or some combination of these systems. Any one or more of multiple types of disk storage (Fibre Channel, SCSI, ATA, and CAS), tape, and optical storage can make up a storage infrastructure. Such centralized data facilities are particularly expensive to maintain, given the cost of real estate, power, cooling, and staffing in addition to the cost of the storage systems.

Although SSPs have grown increasingly more attractive to consumers as a data storage solution, there are presently a number of disadvantages to the consumer associated with use of a SSP. One disadvantage is that SSPs generally charge a monthly or annual fee that is based on the number of PCs or on the storage space allocated to the consumer as well as the bandwidth consumed to upload and download data stored. These charges are necessary to cover the high capital and operational expenses incurred to build and run such centralized data center facilities as well as create profits for SSPs.

A second disadvantage of using a centralized storage service is that the consumer may receive degraded performance from the service if the consumer is geographically remote from the service. The distance between the service and the consumer may adversely impact the performance of the storage service since the rate of data transfer between the consumer's computer and the service is limited by any network congestion between the two. Even in the absence of congestion, the distance between the service and the consumer may also adversely impact the service because of the network transit time of communications sent between the consumer's computer and the storage service. The network congestion and the network latency both impact the speed that data may be transmitted between the computer and the storage service, thereby adversely impacting the performance of the service that the consumer receives.

A third disadvantage of using a centralized storage service is that the storage devices at the centralized storage facility are under the control of the SSP, which may not know how a consumer wishes to use the centralized storage facility. Storage solutions offered by the SSP must be tailored to satisfy a large cross-section of consumers, which limits the ability of an individual consumer to select a configuration or service that best meets the needs of the consumer.

BRIEF DESCRIPTION OF THE DRAWINGS

One or more embodiments of the facility are illustrated by way of example and not limitation in the figures of the accompanying drawings, in which like references indicate similar elements and in which.

DETAILED DESCRIPTION

Figure 1:
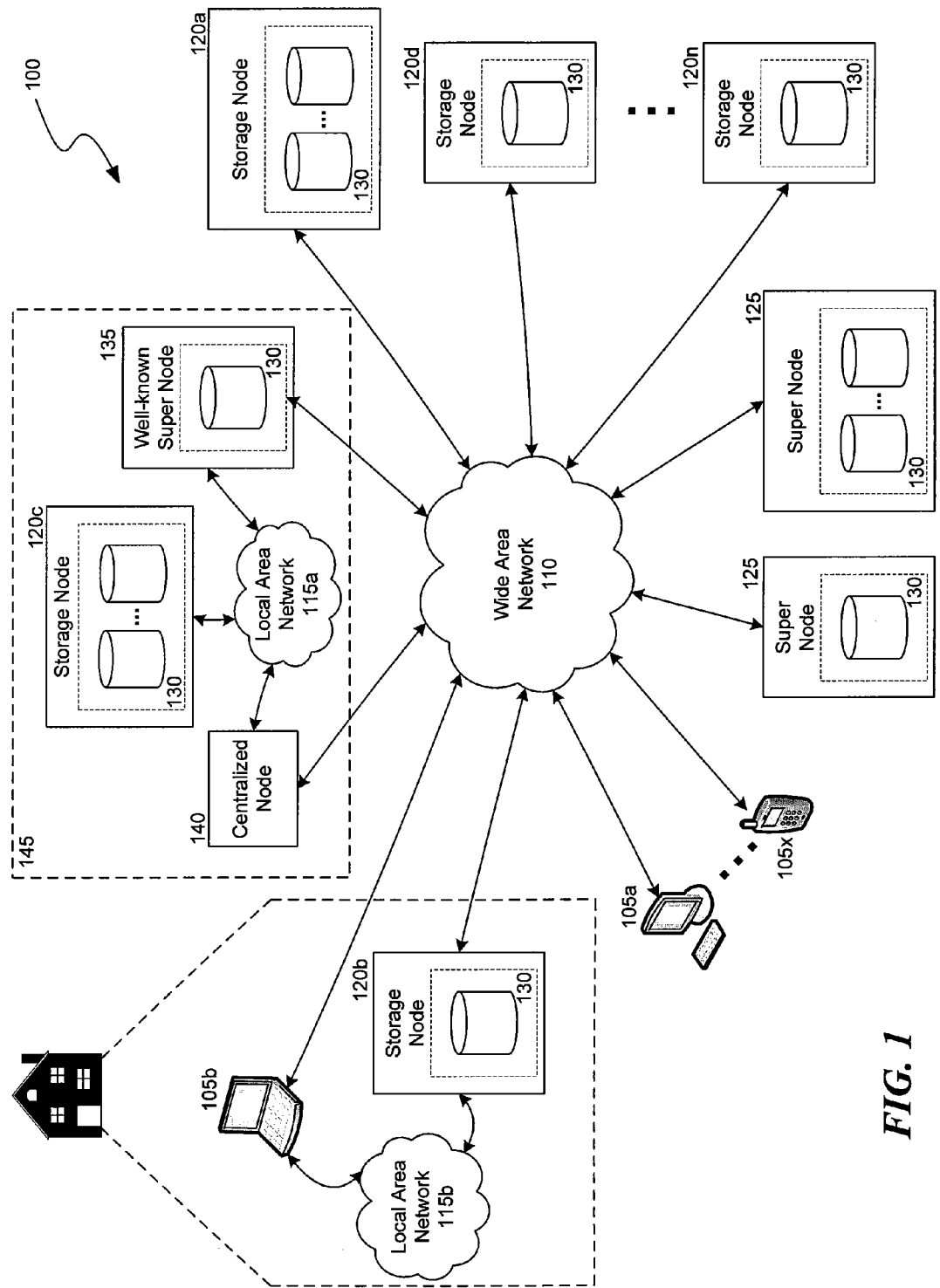
FIG. 1 is a data flow diagram of various components or services that are part of a shared community storage network.

A storage device configured to join a shared community storage network is disclosed. The storage device may be purchased with pre-loaded software programs that enable the storage device to join the shared community storage network. Alternatively, one or more software programs may be downloaded to a computer that enables an existing storage device in the computer to join the shared community storage network. When the storage device is connected to a network, the storage device is manually or automatically registered as a storage node within a shared community storage network. All or a portion of the storage space in the storage device may be registered for use in the shared community storage network. To facilitate description, the storage space of the storage device that is registered for use as a storage node is referred to as "contributed storage" (meaning the storage space is contributed for use with the shared community storage network) and the remaining storage space, if any, is referred to as "private storage" (meaning that the storage space is reserved for personal use).

Once registered, a consumer may store data to the private storage area of the storage device, such as the consumer's music collection, documents, videos, and so forth. At least a portion of such data is then stored durably and securely by encrypting the data, adding redundancy, and distributing it to the other storage nodes within the shared community storage network. Data that is stored in the shared community storage network is accessible to the consumer even if their storage device is disconnected from the network or their storage device fails. As a storage node within the community storage network, the storage device of the consumer may also automatically receive data from third parties and store the received data in the contributed storage area of the consumer's storage device. In addition to benefiting from participating in the community storage network, the consumer is therefore also contributing to the operation of the community storage network.

As introduced herein, in some embodiments, the contributed storage space of the storage device is shared with one or more third parties that access the shared community storage network. That is, the facility enables third parties to store their own data in the contributed storage area of a consumer's storage device. The facility also enables the third parties to remotely-access the stored data. The stored data is encrypted so that the consumer and other parties lacking authorization cannot access the data stored in the contributed storage area.

In exchange for the consumer allowing the contributed storage area on the storage device to be shared, the shared community storage network may reward the consumer with economic or non-economic incentives. Economic incentives may include, but are not limited to, periodic cash payments to the consumer, reward points that are redeemable at various retail and/or online stores, gifts, reduced-price goods and/or services, etc. Non-economic incentives offered to the consumer may include, but are not limited to, services such as the automatic back-up of consumer data that is contained in the private storage area of the storage device, customer support, additional storage space exceeding that of the storage device, etc. Such economic and/or non-economic incentives may be targeted at specific consumers, such as, for example, consumers having storage devices with greater than 50% storage capacity available, greater than 50% of bandwidth available, and/or storage devices that are maintained in an operational state and made accessible for over 90% of the time. The economic and/or non-economic incentives are provided to encourage consumers to increase the amount of storage space that they contribute as well as improve the reliability (or up-time) of a storage device acting as a storage node.

It will be appreciated that the disclosed storage device offers significant benefits to consumers that use the device. In exchange for agreeing to share an unreliable and un-trusted resource, the consumer may receive, for example, back-up services from an extremely reliable and stable storage service offered via the shared community storage network. Consumers may also receive economic incentives such as periodic payments of cash or points that may be redeemed for goods and/or services. The overall cost of owning and operating the storage device may therefore be reduced over time. Additional advantages of the storage device will become apparent as further features of the device are described herein.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid obscuring the description of the various embodiments. The terminology used in the description presented below is intended to be interpreted in its broadest reasonable manner, even though it is being used in conjunction with a detailed description of certain specific embodiments of the invention.

Before describing the storage device in greater detail, it is useful to consider an environment in which the storage device can be utilized. FIG. 1 is a data flow diagram that illustrates various components or services that are part of or interact with a shared community storage network 100. As introduced herein, the shared community storage network is a network of storage nodes across which storage space is aggregated and offered as a service to users. A storage node is a logical construct representing all or a portion of any physical device that can store electronic information, such as a disk, a computer hard drive (having, e.g., magnetic disks, optical disks, magneto-optical disks), a file server, a block-based server, a memory (e.g. a flash storage device), or a like device. The physical storage device may be a stand-alone device, or it may be a component of a client device, such as a personal computer, a laptop computer, or a wireless router. Typically, storage nodes receive and respond to various transaction requests (e.g., read, write, etc.) from other devices directed to data that is currently stored or will be stored at the storage nodes. In some embodiments, the shared community storage network 100 is configured as an overlay network. Nodes in the overlay can be thought of as being connected by virtual or logical links, each of which corresponds to a physical path in the underlying network.

In some embodiments, users access the shared community storage network 100 through client devices 105*a*, 105*b*, . . . 105*x*. The client devices may connect to the shared community storage network through a network, such as a wide area network (WAN) 110 (e.g., a private or public network like the Internet) or a local area network (LAN) 115*a*, 115*b*. Client devices 105*a*, 105*b*, . . . 105*x* may be, for example, personal computers (PC), workstations, mobile devices, cellular phones, and so forth. Details regarding client devices are known and well documented, and thus need not be described in detail in order to gain an understanding of the concepts and operation of the shared community storage network.

Storage nodes 120*a*, 120*b*, . . . 120*n* store data objects durably and securely within the shared community storage network. "Durably" means that data objects are stored in multiple nodes in the shared community storage network so that a user is able to access the stored data objects even if one or more storage nodes are inaccessible or corrupted, and even when their own storage device is unavailable. "Securely" means that the data objects are stored in an encrypted form so that only authorized users are able to access and utilize the stored data. For example, at least a portion of the data objects stored by a user on storage node 120*b* may be encrypted and distributed to other storage nodes within the shared community storage network 100, thereby providing the user with storage that is accessible to the user even if storage node 120*b* is unavailable (e.g., disconnected from network 110 and/or 115*b*) or if the storage device associated with storage node 120*b* fails.

Within the shared community storage network 100, certain storage devices perform the role of a super node 125. Super nodes 125 help manage the shared community storage network 100. That is, in some embodiments, super nodes store metadata describing the shared community storage network, which is used to track the location of data objects in the overlay and route storage requests (e.g., read/write requests) from client devices to storage nodes. The super nodes also generally facilitate data transfers between client devices and storage nodes. As described herein, super nodes typically manage a number of storage nodes (e.g. between 1,000 and 10,000 storage nodes) and maintain routing tables that include the network addresses and node IDs of the storage nodes. The super nodes also typically maintain routing tables that include the network addresses and node IDs of at least some of the other super nodes in the shared community storage network.

A physical storage device may perform one or more roles in the shared community storage network. For example, a storage node and a super node may be collocated on the same storage device. Those skilled in the art will appreciate that the storage subsystem 130 of a storage device may include one or more types of storage, such as, for example, magnetic disks, optical disks such as CD-ROM or DVD based storage, magneto-optical (MO) storage, a memory (e.g. a flash storage device), or any other type of non-volatile storage component suitable for storing large quantities of data. In some embodiments, the storage in storage subsystem 130 is organized as a Redundant Array of Inexpensive Disks (RAID), in which case the storage nodes 120a, 120b, . . . 120n, and super nodes 125 access the storage subsystem 130 using one or more well-known RAID protocols.

In some embodiments, the roles performed by a storage device may change over time, e.g., a portion of a storage device serving as a storage node may become a super node, a portion of a storage device serving as a super node may become a storage node, and a portion of a storage device serving as a super node or storage node may become both a super node and a storage node. Heuristics may be used to determine the role of a storage device. For example, such heuristics may be based on the location of a storage device, the bandwidth of the connection to a storage device, the processing capabilities of a storage device, and so forth. The role of a storage device may be determined on a sporadic basis, on a periodic basis, during periods of low activity, for any predefined event, depending on network load, etc.

The shared community storage network 100 also includes a number of "well-know" super nodes 135 and a centralized node 140. Super nodes 135 are characterized as "well-known" if they are accessible at known and fixed network addresses. The centralized node 140 maintains a list of the well-known super nodes 135, and in some embodiments, enables storage nodes to register with the shared community storage network as described herein.

In some embodiments, the well-known super node 135 and centralized node 140 are located within a centralized and secure environment 145, such as a data center. The centralized node may therefore communicate with the well-known super node via a local area network 115a. The super nodes 125 may also be located in a secure and reliable environment, such as one or more data centers. Such a configuration ensures greater stability of the community storage network, since the availability of the centralized node, the well-known super node, and the super nodes may be more readily maintained. At certain times, one or more storage nodes, such as storage node 120c, may also be located within a secure and reliable environment, such as centralized and secure environment 145. Adding guaranteed storage resources to the secure environment ensures that at least a minimum amount of storage service is available during a phase when a shared community storage network is initially being created. As additional storage nodes are added by other users to the shared community storage network, less reliance may be placed on the storage nodes that are contained at the secure environment and greater reliance may be placed on storage nodes that are accessible via the wide area network 110. As the number of storage nodes continues to grow, eventually no storage nodes may be located in a secure environment. The amount of storage nodes in the secure environment may therefore grow and shrink based on changing demand for storage services, rate that storage nodes are being contributed by users to the shared community storage network, and other environmental factors such as desired redundancy levels, uptime, network conditions, etc.

In some embodiments, the centralized node 140 authenticates storage nodes (e.g., using signed certificates, passwords, etc.) that join the shared community storage network 100. Details regarding authentication are known and well documented, and thus need not be described in detail in order to gain an understanding of the concepts and operation of the shared community storage network. Upon authenticating a storage node, the centralized node 140 may issue a session certificate, which includes the public key half of a public/private key pair uniquely associated with the storage node. The session certificate may also include a starting time and an ending time corresponding to a period for which the storage node is allowed to participate in the shared community storage network. In some embodiments, storage nodes exchange their respective certificates as part of the storage process. For example, a super node may authenticate a storage node and the storage node may authenticate the super node using the certificates issued to each by the centralized node 140. Details regarding certificate-based authentication techniques are known and well documented, and thus need not be described in detail in order to gain an understanding of the concepts and operation of the shared community storage network.

The number of storage nodes and/or super nodes in a shared community storage network is not limited to the number of nodes or ratio of nodes illustrated in FIG. 1. The disclosed shared community storage network is designed to scale to include thousands or millions of nodes. Moreover, those skilled in the art will appreciate that the shared community storage network 100 may include other types of nodes and/or devices. The shared community storage network may include, for example, proxy nodes (not shown) that allow storage nodes that cannot receive unsolicited connections to participate in the shared community storage network.

As another example, the shared community storage network may include a storage service management node (not shown) that monitors use information associated with each of the storage nodes. Such use information may include information reflecting the storage space consumed by third parties on each storage node, the bandwidth used in accessing (reading and writing) such third party data, the number of accesses to each storage node, and other performance characteristics of each storage node. The storage service management node may receive such information directly from the storage nodes or indirectly from the super nodes. For example, each storage node may include an access manager component that monitors use information for that node and periodically reports such use information to a super node and/or a storage service management node.

In some embodiments, the storage service management node generates one or more reports based on the monitored use information, and such reports may be used by an operator of the shared community storage network to compensate storage device owners. For example, to encourage owners to increase the amount of contributed storage space and/or improve the reliability of the storage node, the operator of the shared community storage network may compensate owners of storage devices that make available more than 50% of the storage capacity of their device. As other examples, the operator may compensate owners of storages devices that connect their storage devices to the shared community storage network with a high bandwidth connection, or owners that maintain their storage devices in an operational state and accessible to the shared community storage network over 90% of a measurement period (e.g., day, week, month). As described herein, such compensation may include economic and/or non-economic incentives. The storage service management node is typically located in a secure environment, such as a data center, in order to maintain the integrity of the metering and billing functions.

Several benefits are achieved by a community storage network that can scale to encompass such a large number of nodes. For example, the large number of nodes allows a significant amount of storage space to be aggregated and redistributed to other users. As the number of nodes becomes sufficiently large, the traffic to the community storage network becomes more statistically predictable and therefore easier to manage. In addition, a large number of nodes will typically ensure geographic diversity in the community storage network. Geographic diversity protects against local disruptions (e.g., due to power failures, severe weather, catastrophic events such as earthquakes, disruptions from viruses, etc.) of the storage service. Geographic diversity also increases the likelihood that there are a number of storage nodes in close proximity to users of the shared community storage network such that network congestion and latency are significantly reduced regardless of the users' geographic location.

Figure 2:
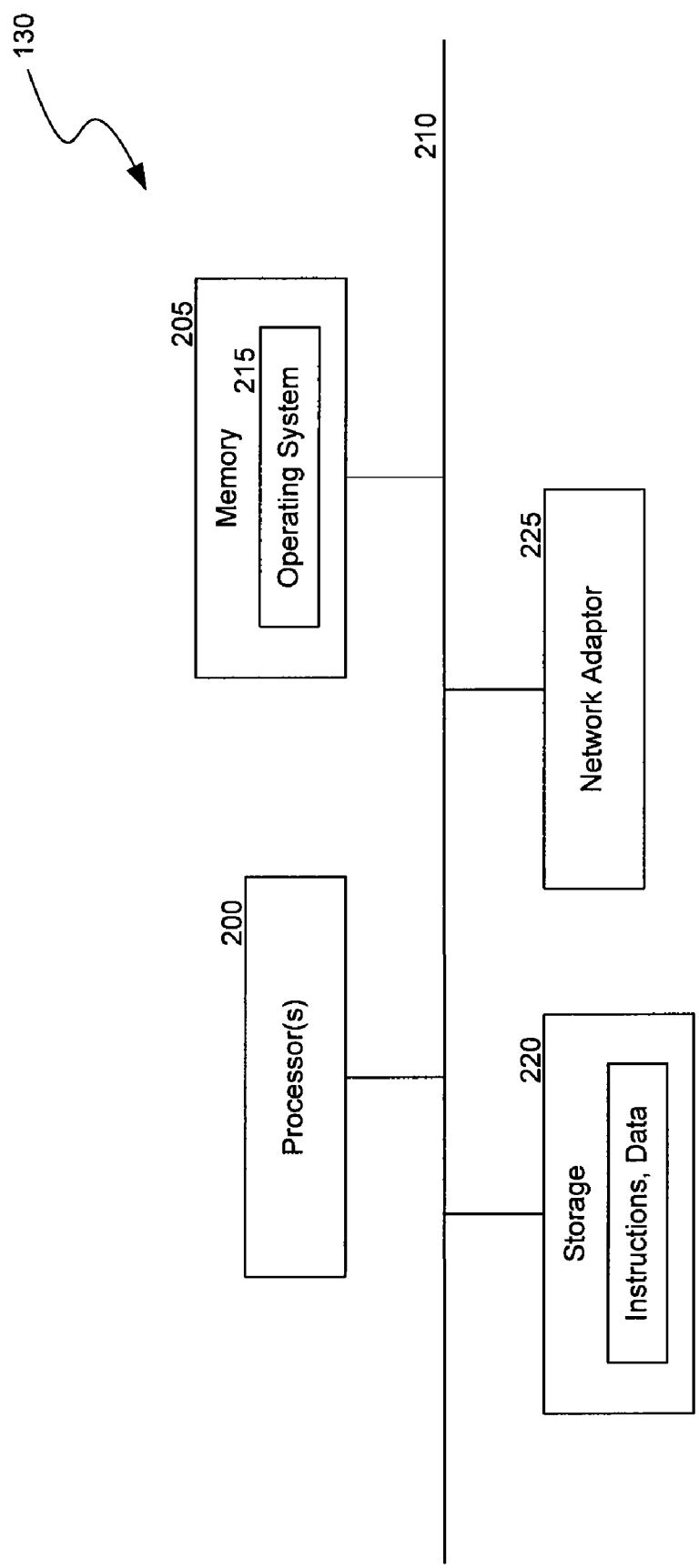
FIG. 2 is a block diagram of a storage device.

FIG. 2 is a high-level block diagram showing an example architecture of a storage device, all or a portion of which may operate as a storage node. Those skilled in the art will appreciate that certain well-known structures and functions have not been shown or described in detail to avoid obscuring the description. As illustrated, a storage device includes one or more processors 200 and memory 205 coupled to an interconnect system 210. The interconnect system 210 shown in FIG. 2 is an abstraction that represents any one or more separate physical buses and/or point-to-point connections, connected by appropriate bridges, adapters and/or controllers. The interconnect system 210 may include, for example, a system bus, a form of Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 200 are the central processing units (CPUs) of the storage device and, thus, control its overall operation. In some embodiments, the processors 200 accomplish this by executing software stored in memory 205. A processor 200 may be, or may include, one or more programmable general-purpose or special-purpose microprocessors, programmable controllers, application specific integrated circuits (ASICs), programmable logic devices (PLDs), or the like, or a combination of such devices.

Memory 205 includes the main memory of the storage device. Memory 205 represents any form of random access memory (RAM), read-only memory (ROM), flash memory, or the like, or a combination of such devices. Memory 205 stores, among other data, the storage device's operating system 215. Also connected to the processors 200 through the interconnect system 210 are one or more mass storage devices 220 and a network adapter 225. Mass storage devices 220 may be or include any conventional medium for storing large volumes of data in a non-volatile manner, such as one or more magnetic or optical based disks, flash memory devices, or any other type of non-volatile storage device suitable for storing data durably. The network adapter 225 allows the storage device to communicate with other devices, such as clients devices 105 or other storage nodes over a network such as network 110 and/or networks 115a and 115b. The network adapter may be, for example, an Ethernet adapter or a Fiber Channel adapter.

Figure 3:
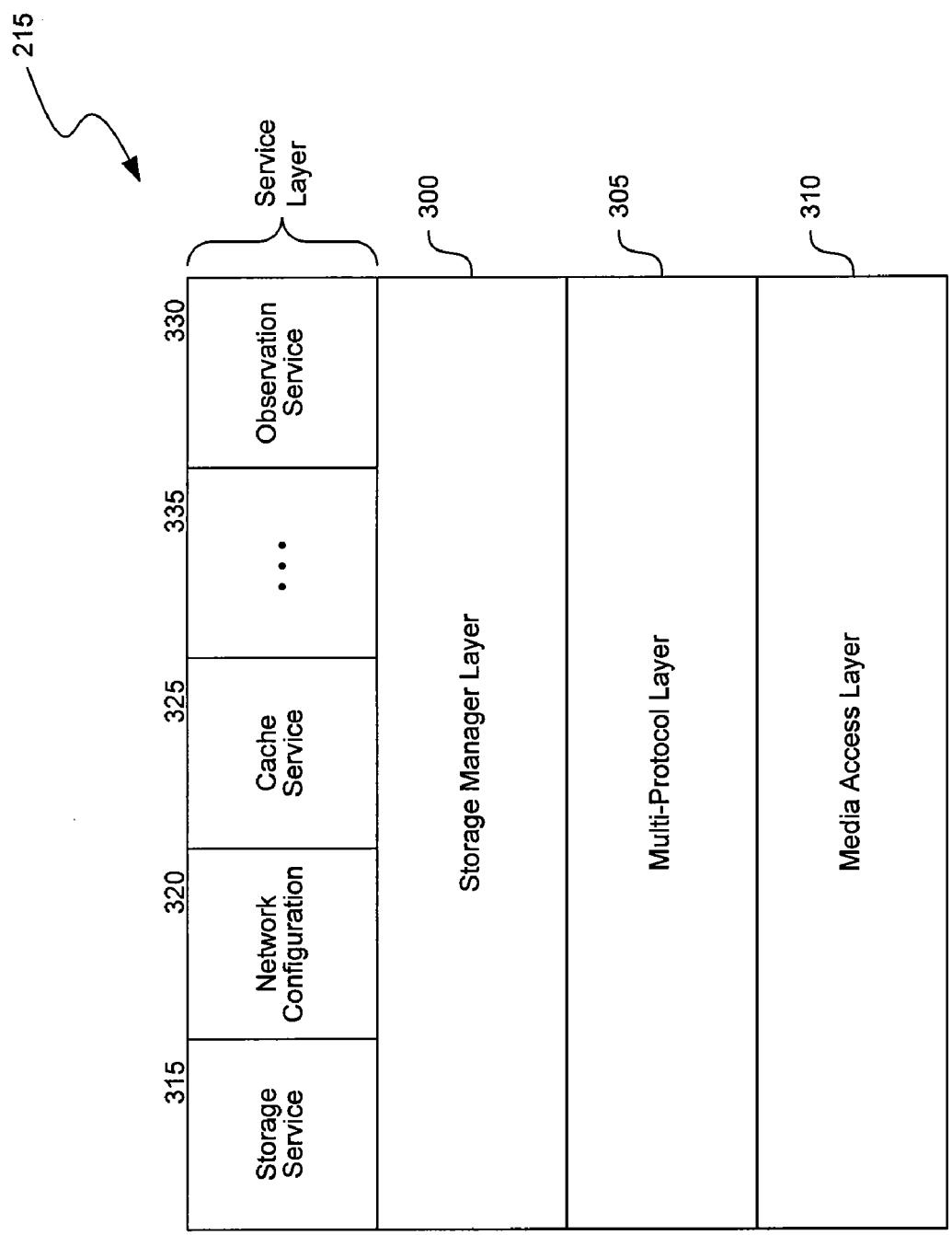
FIG. 3 is a block diagram of an operating system of a storage device.

FIG. 3 shows an example of the architecture of the operating system 215 of a storage device. As shown, the operating system 215 comprises several software layers, including a storage manager layer 300. The storage manager layer is application-layer software that imposes a structure on the data stored in the storage subsystem 130, and services transaction requests received from client devices 105 and other storage nodes. In some embodiments, the storage manager implements a Write Once, Read Many ("WORM") file system algorithm, a Secure File System algorithm, a Network File System algorithm, etc. Those skilled in the art will appreciate that the shared community storage network does not depend on the file system algorithm implemented by the storage devices.

Logically "under" the storage manager, is a multi-protocol layer 305 and an associated media access layer 310, which collectively enable the storage device to communicate over a network (such as networks 110, 115a, 115b) to other storage devices. The multi-protocol layer 305 implements various higher-level network protocols, such as Network File System (NFS), Common Internet File System (CIFS), Hypertext Transfer Protocol (HTTP) and/or Transmission Control Protocol/Internet Protocol (TCP/IP). The media access layer 310 includes one or more drivers which implement one or more lower-level protocols to communicate over the network, such as Ethernet, Fibre Channel, or Internet small computer system interface (iSCSI).

In some embodiments, the operating system 215 also includes various services in a service layer logically "above" the storage manager layer 300. For example, operating system 215 may include a storage service 315, a network configuration service 320, a cache service 325, and an observation service 330. The storage service 315 enables all or a portion of the storage device that operates as a storage node to exchange data with other storage nodes in the shared community storage network. The network configuration service 320 receives and responds to requests to assign and/or verify the IP address of the storage node. For example, the network configuration service may respond to requests by providing the storage node name, node identifier (ID), IP address information, and so forth. The cache service 325 caches the data corresponding to addresses stored in other storage nodes. The operating system may also include other services 335 not mentioned here. For example, when the storage device functions as a super node 125 within the shared community storage network, the operating system may also include various management services (not shown). Those skilled in the art will further appreciate that some or all of the services may be implemented by a device other than the storage device. For example, in some embodiments, the cache service 325 is implemented in a separate device that caches objects that would otherwise be cached at the storage device.

Figure 4:
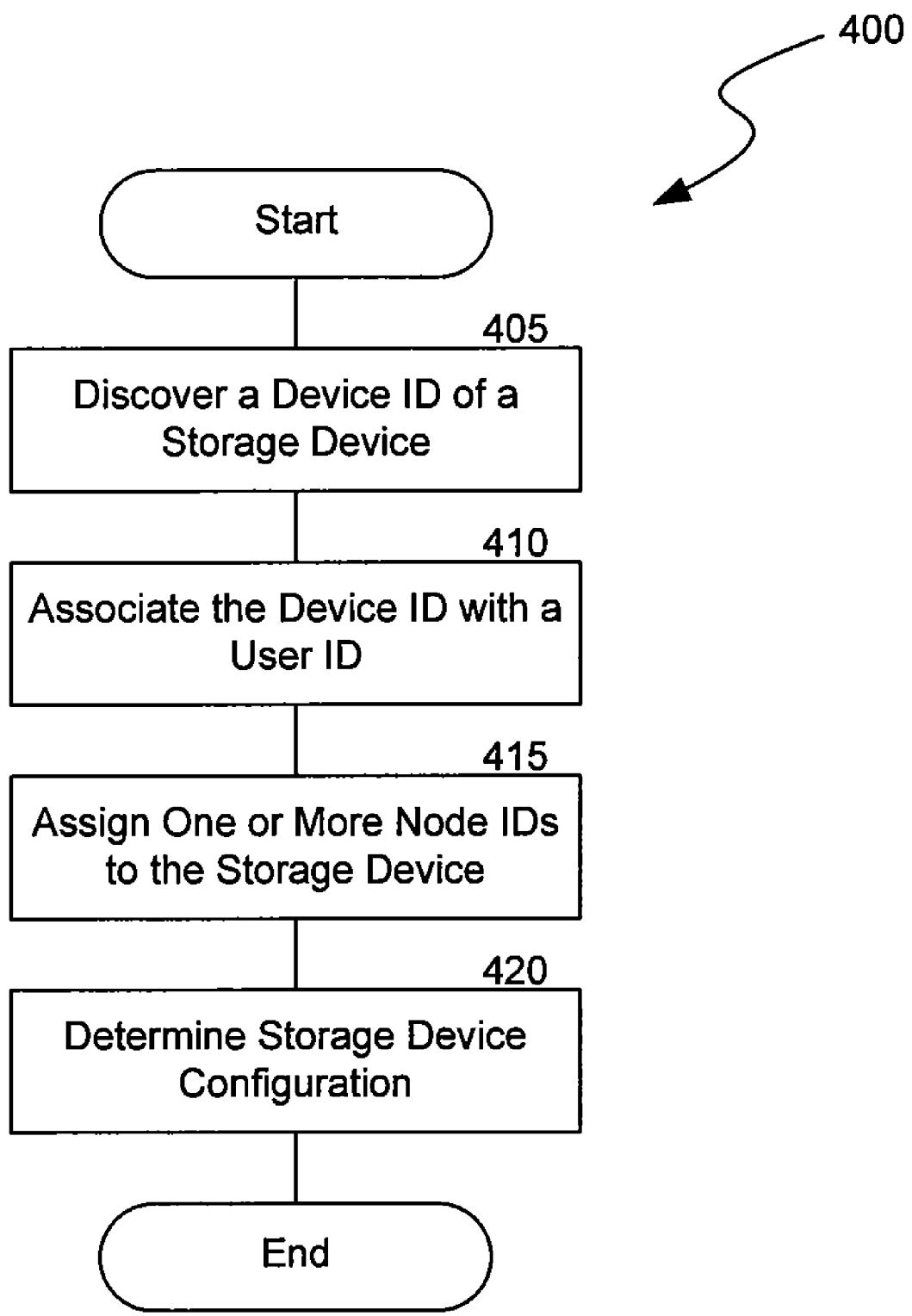
FIG. 4 is a flow chart of a registration process performed by the facility.

To facilitate description, it is assumed that the storage node 120b is a new storage node that is being added by a user to the shared community storage network. Storage node 120b is a logical mapping to all or a portion of the storage device contained in client device 105b. FIG. 4 is a flow chart of a process 400 performed by a software facility (hereinafter "the facility") to register a storage node with a shared community storage network 100. In some embodiments, process 400 is performed by the centralized node 140.

At a block 405, the facility determines the identifier of the storage device (the "device ID"), which is unique to the storage device and may be, for example, a machine ID. In some embodiments, the device ID is automatically discovered by the facility at block 405 when the storage device is powered-on and connected to a network (such as network 110, 115a, or 115b) by the user. While in other embodiments, the device ID is manually entered by the user through a registration interface, such as a web page or a registration wizard. That is, a user may separately access a service and manually enter a device ID and address that is associated with a client device that is owned or operated by the user.

At a block 410, the facility associates a user ID with the determined device ID. In some embodiments, this is accomplished by the user accessing a registration interface, such as a web page or a registration wizard, and providing the facility a user ID (e.g., an email address, a username, a password, or a combination thereof) after providing authentication information. In some embodiments, to determine the user ID, the facility correlates information that was received during the purchase of the client device (e.g., credit card information, name and address that are provided by the purchaser) with the device ID that was recorded at the time of purchase. It will be appreciated that users may possess any number of storage devices that may be registered with the facility.

In some embodiments, a user ID is created and then associated with the determined device ID. For example, if the facility receives an unknown user ID, the facility may determine whether the user is a new user. In some embodiments, users are provided the opportunity to establish a user account that is then uniquely associated with their device ID. A user account may include various information about the user, such as, for example, the user's name, mailing address, billing information, demographic information (e.g., age, gender, occupation, areas of interest, income, etc.), usage habits, and so forth. Such account information may also include other user information not mentioned here. For example, the account information may include a physical location or address of each storage device registered by the user.

At a block 415, if not previously established, communication is established between the storage device and a well known super node, and the well known super node assigns one or more identifiers to identify one or more storage nodes that are mapped to the storage device (each identifier, a "node ID"). A node ID may be, for example, a randomly generated m-bit number. Node IDs may be assigned using what is known as consistent hashing, such as by using the SHA-1 algorithm. More than one node ID may be assigned to a storage device to identify logical storage nodes that become part of the community storage network. A node ID is used by the system to uniquely identify a storage node for storage transactions.

At a block 420, the facility determines the capabilities of the storage node, which may include, for example, the underlying storage device's processing capability (e.g., a processor type and/or machine instructions per second (MIPS) rating), storage capability (e.g., memory size, speed, and configuration), I/O capability, bandwidth, location, and so forth. One or more of the capabilities of the storage node may be determined by identifying the manufacturer, model, version, and/or serial number of the underlying storage device. One or more capabilities of the storage node may also be determined by measuring the response time of certain requests directed to the storage node. For example, the centralized node 140 may communicate with the storage node to determine the apparent bandwidth and network latency of the storage node.

In some embodiments, certain capabilities of the storage node may be assumed by the facility if, for example, such capabilities cannot be determined and/or are not provided by the user. For example, the facility may assume that a storage node will be available 90% of the time. The capability assumptions made by the facility may be based on the measured performance of like storage nodes measured across all or part of the shared community storage network. Certain capabilities of the storage node, such as the maximum theoretical processing capability of the storage node, may remain fixed over time. Other capabilities of the storage node, such as the bandwidth available to communicate with the storage node and its lifetime in the network, may vary over time.

For those capabilities that are expected to change over time, the facility may observe the capability of a storage node for a given time period, or may periodically or sporadically assess the capability of the storage node. The capabilities of a storage device may be used by the facility to optimize use of the storage node or operation of the shared community storage network. For example, the role of a storage device (e.g., storage node, super node, etc.) may change over time. The facility may therefore determine the best role of a storage device based on the capabilities of the storage device and the configuration of the shared community storage network 100.

Those skilled in the art will appreciate that the blocks shown in FIG. 4 and in each of the following flow diagrams may be altered in a variety of ways. For example, the order of certain blocks may be rearranged; certain substeps may be performed in parallel; certain shown blocks may be omitted; or other blocks may be included; etc.

Figure 5:
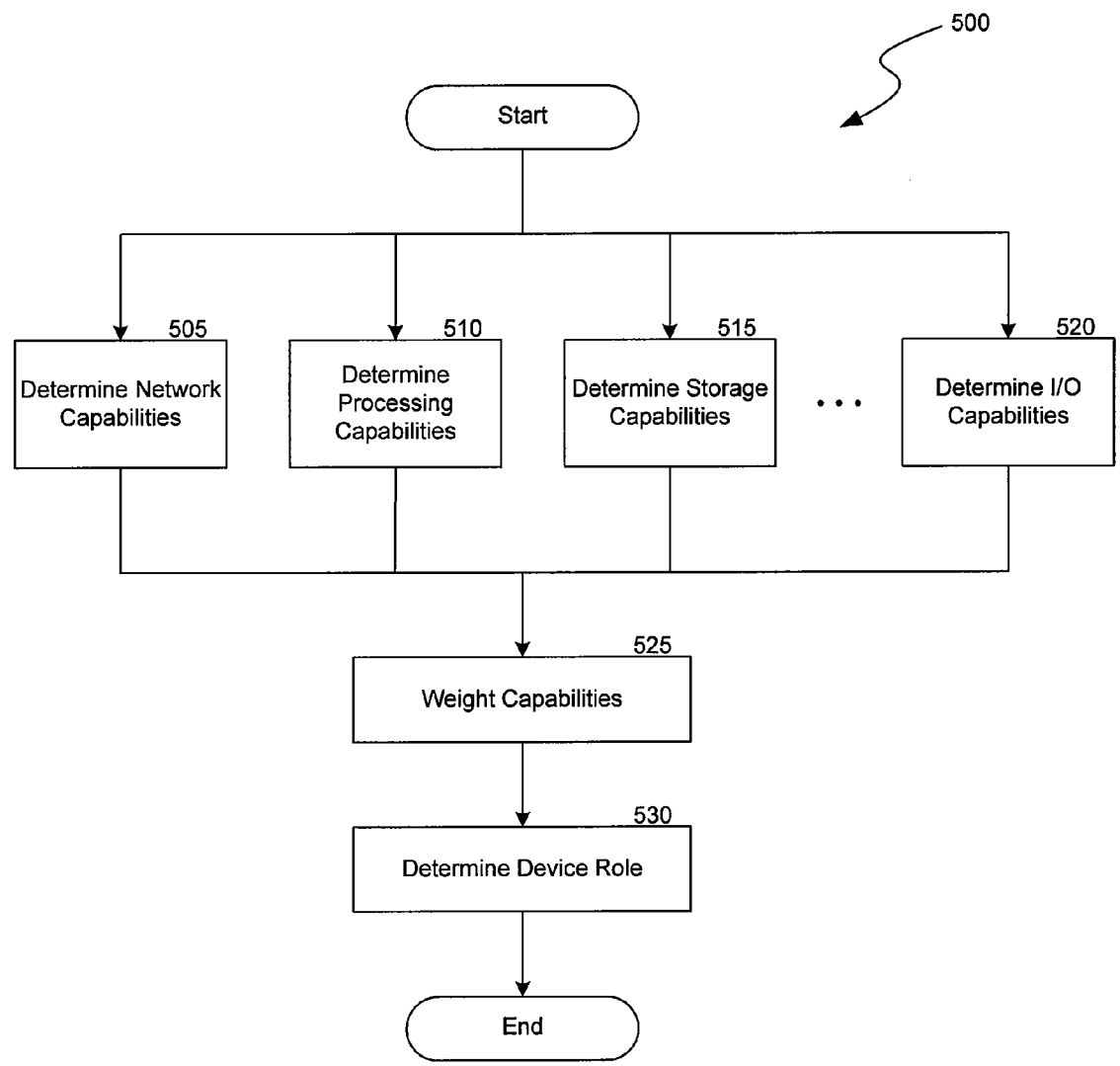
FIG. 5 is a flow chart of a role determination process performed by the facility.

FIG. 5 is a flow chart of a process 500 that may be performed by the facility to determine the role of a storage device. In some embodiments, for example, process 500 is performed by the centralized node 140 when a storage device registers and joins the shared community storage network 100.

The facility may rely on heuristics to determine the role of a storage device. Such heuristics may be based on the network capabilities of a storage device, the processing capabilities of a storage device, the storage capabilities of a storage device, and other factors. Such heuristics may or may not be experience-based. At a block 505, the facility determines the network capabilities of the storage device or of the network to which the storage device is connected. The network capabilities may include, for example, the communication data rate of the storage device or the bandwidth of the network connection to the storage device. The network capabilities may also include information about whether the storage device is located behind a firewall, network address translator (NAT), or other device that may prevent incoming connections. Typically, storage nodes in the network are located behind such devices. When a storage device is located behind such a device, a number of techniques may be used to traverse the device, such as port forwarding, UDP hole punching, tunneling, UPNP, or manual configuration.

At a block 510, the facility determines the processing capabilities of the storage device. The processing capabilities may include, but are not limited to, the processor type and machine instructions per second (MIPS) rating of the storage device. The processing capabilities may measure the theoretical processing capabilities of the storage device or the actual processing capabilities of the storage device during typical, above typical, or peak operation. For example, the facility may transmit a "get_load" request to the storage device to determine the current processing load of the storage node. The facility may determine that a storage device is too heavily loaded to function as a super node even though other factors weigh heavily in favor of the storage device acting as a super node.

At a block 515, the facility determines the storage capabilities (i.e., the contributed storage space) of the storage device. The storage capabilities may include, but are not limited to, information about the memory size, speed, and/or configuration of the storage device. The storage capabilities may measure the maximum available capacity of a storage device, an average available capacity of a storage device, or some other measure of capacity. At a block 520, the I/O capabilities of the storage device are determined. For example, the I/O capabilities of a storage device may include relevant input/output information such as whether the storage device is able to exchange messages on a particular network bus.

One or more of the storage device capabilities 505-520 may be determined by identifying the manufacturer, model, version, and/or serial number of the storage device. This may be accomplished, for example, by the facility querying the storage device directly, by the storage device providing such information when initially registering with the shared community storage network, or by the facility receiving information that is manually entered by a user. The storage device identifying information is correlated with stored information about the capabilities of that storage device. One or more of the storage device capabilities 505-520 may also be determined by actual measurement of the device capabilities. The facility may perform such measurements once, periodically, or sporadically in order to accurately assess the storage node capabilities. Other capabilities or factors not mentioned here may also be considered in process 500. For example, in some embodiments, the physical or network location of a storage device may be considered in determining the role or roles of that storage device.

At a block 525, the facility weighs the determined capabilities of a storage device to assess the optimal role for the device. The weighting may be based on the capabilities of other storage devices within the shared community storage network. That is, the weighting may take into account the capabilities of other storage devices in the network in order to identify those devices having a preferred combination of capabilities.

At a block 530, the facility determines the role of the storage device. In some embodiments, the process 500 is initially performed by the centralized node 140 when a storage device is registered with the shared community storage network. As described herein, the role of a storage device may be reassessed on a sporadic basis, on a periodic basis, during periods of low activity, for any predefined event, depending on network load, etc.

After a storage device is registered, the logical storage node or nodes that are mapped onto the storage device join the shared community storage network 100. In some embodiments, the role of the storage device determines how the corresponding storage node or nodes join the shared community storage network. In some embodiments, all storage nodes first join the shared community storage network as storage nodes, rather than super nodes.

Figure 6A:
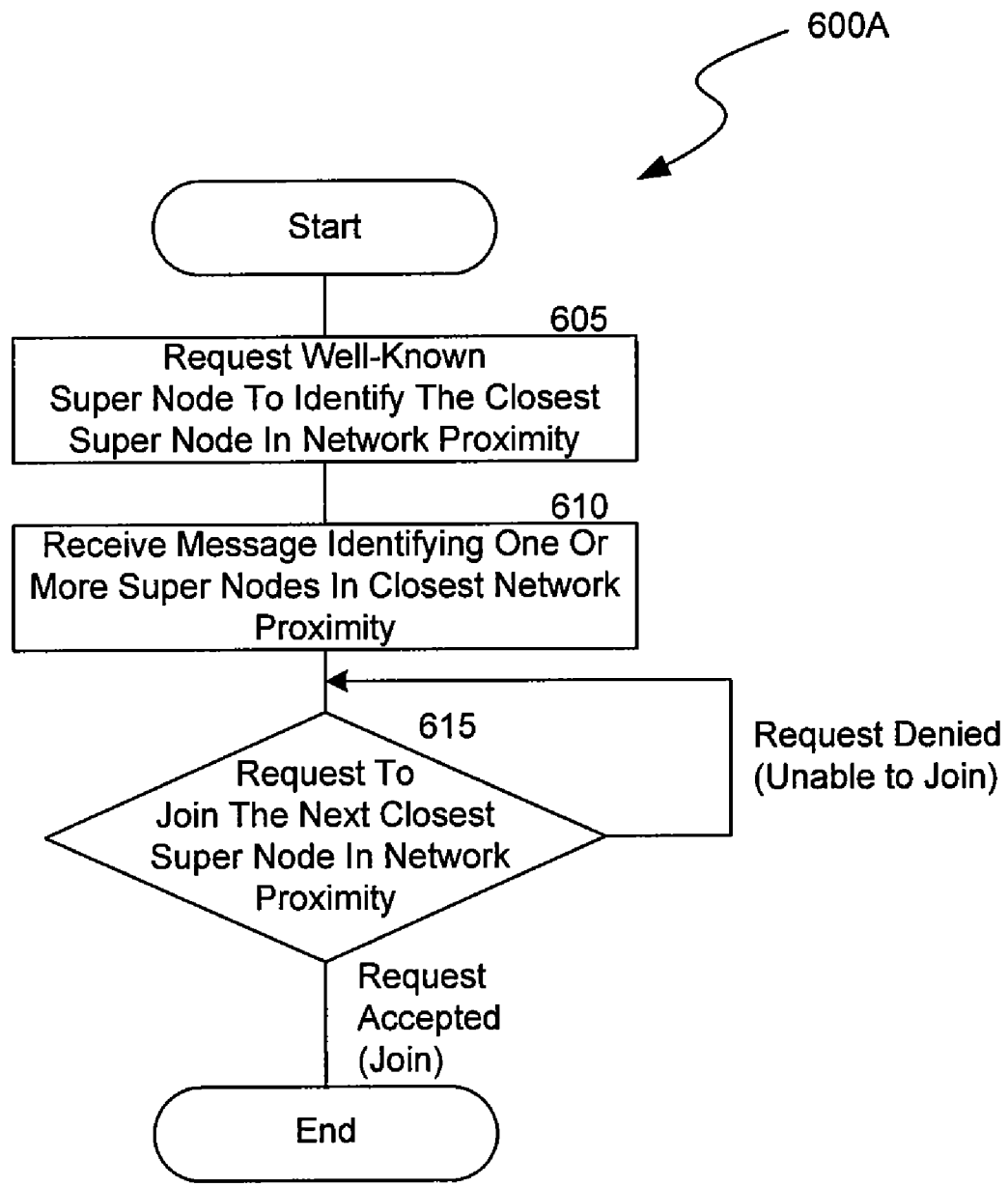
FIG. 6A is a flow chart of a process performed by a storage node to join a shared community storage network.

FIG. 6A is a flow chart of a process 600A performed by a storage node 120 to join a shared community storage network 100. At a block 605, the storage node sends a request to a well-known super node 135 to identify the super node 125 in closest network proximity to the storage node 120. In some embodiments, traceroute or a similar network tool is used to determine the network proximity of a storage node to a super node. Those skilled in the art will appreciate that network proximity may take into account a number of measurable factors (e.g., latency, hops, etc), and that such factors may be determined using a combination of pinging, TCP ACK, UDP, and other polling techniques. In some embodiments, rather than joining the super node in closest network proximity, the storage node joins a random super node or a super node having the closest node ID to the storage node.

At a block 610, the storage node receives a message from the well-known super node that identifies one or more super nodes in closest network proximity to the storage node. For example, the message may identify a primary super node and a secondary (i.e., alternative) super node. The alternative super mode may be utilized if the primary super node is unavailable or has changed roles in the shared community storage network. Those skilled in the art will appreciate that the facility may provide additional super nodes (e.g. a tertiary super node) if the roles of nodes in the shared community storage network frequently change.

At a block 615, the storage node requests to join the primary super node identified at block 610. If the request is accepted by the facility at block 615, the process ends. Otherwise, the storage node requests to join the next super node in closest network proximity identified at block 615. When a storage node joins a super node, the super node stores a metadata entry describing the storage node and the underlying storage device capabilities (e.g., storage node location, network proximity, processing capabilities, storage capabilities, etc.). As described herein, each super node also maintains a routing table that includes the network addresses and node IDs of the storage nodes managed by that super node. The routing table may also include the network addresses of certain super nodes.

Those skilled in the art will appreciate that as storage nodes join and leave the shared community storage network 100, and/or as the roles of storage nodes change over time within the shared community storage network, the network proximity between a storage node 120 and its primary super node 125 may also change. In some embodiments, the facility may therefore reassign a super node in closest network proximity to a storage node on a sporadic basis, on a periodic basis, during periods of low activity, for any predefined event, depending on network load, etc.

Figure 6B:
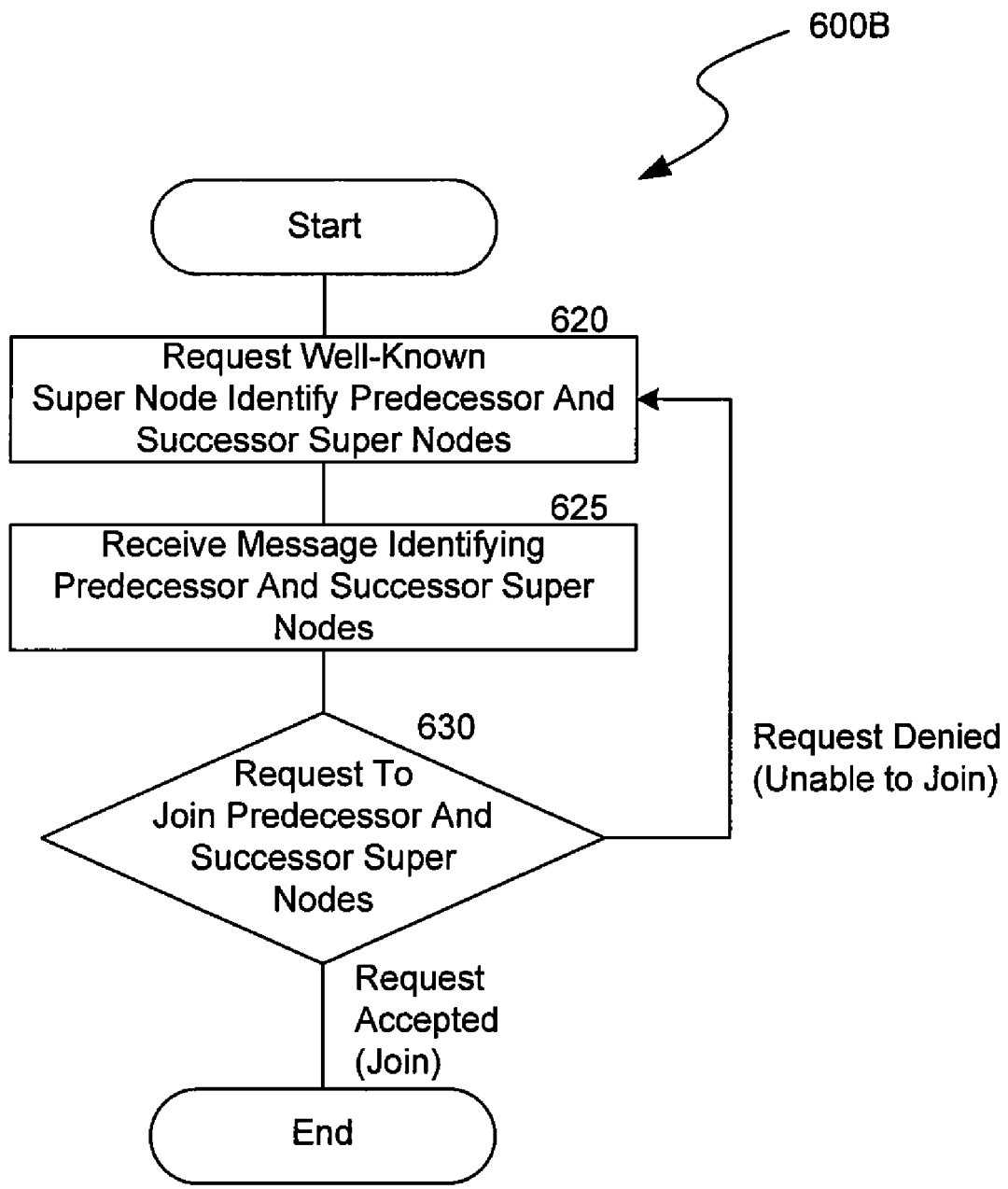
FIG. 6B is a flow chart of a process performed by a super node to join a shared community storage network.

Super nodes 125 and 135 form the backbone of the shared community storage network 100. That is, the super nodes are self-organized and form a structured or unstructured overlay network. FIG. 6B is a flow chart of a process 600B performed by the facility to add a new super node to a shared community storage network.

At a block 620, the super node sends a request to a well-known super node to identify the two super nodes having node IDs in closest numerical proximity to the node ID of the super node. That is, the super node sends a request to a well-known super node to identify the predecessor super node and the successor super node. The predecessor super node has a node ID that is numerically less than (and numerically closest to) the node ID of the super node. The successor super node has a node ID that is numerically greater than (and numerically closest to) the node ID of the super node. The successor of the super node with the numerically highest node ID is the super node with the numerically lowest node ID. Because each super node is joined to its predecessor and successor, the super node address space forms a "ring" network topology.

At a block 625, the super node receives a message from the well-known super node that identifies the predecessor and successor of the super node. At a block 630, the super node requests to join the predecessor and successor super nodes identified at block 625. If the requests are accepted at block 630, the process ends. Otherwise, the super node sends a request to a well-known super node to identify a different predecessor super node and successor super node at block 620. It will be appreciated that other techniques may be used to self-organize the super nodes, including the use of other distributed hashing tables, Peer Name Resolution Protocol (PNRP), etc.

Figure 7:
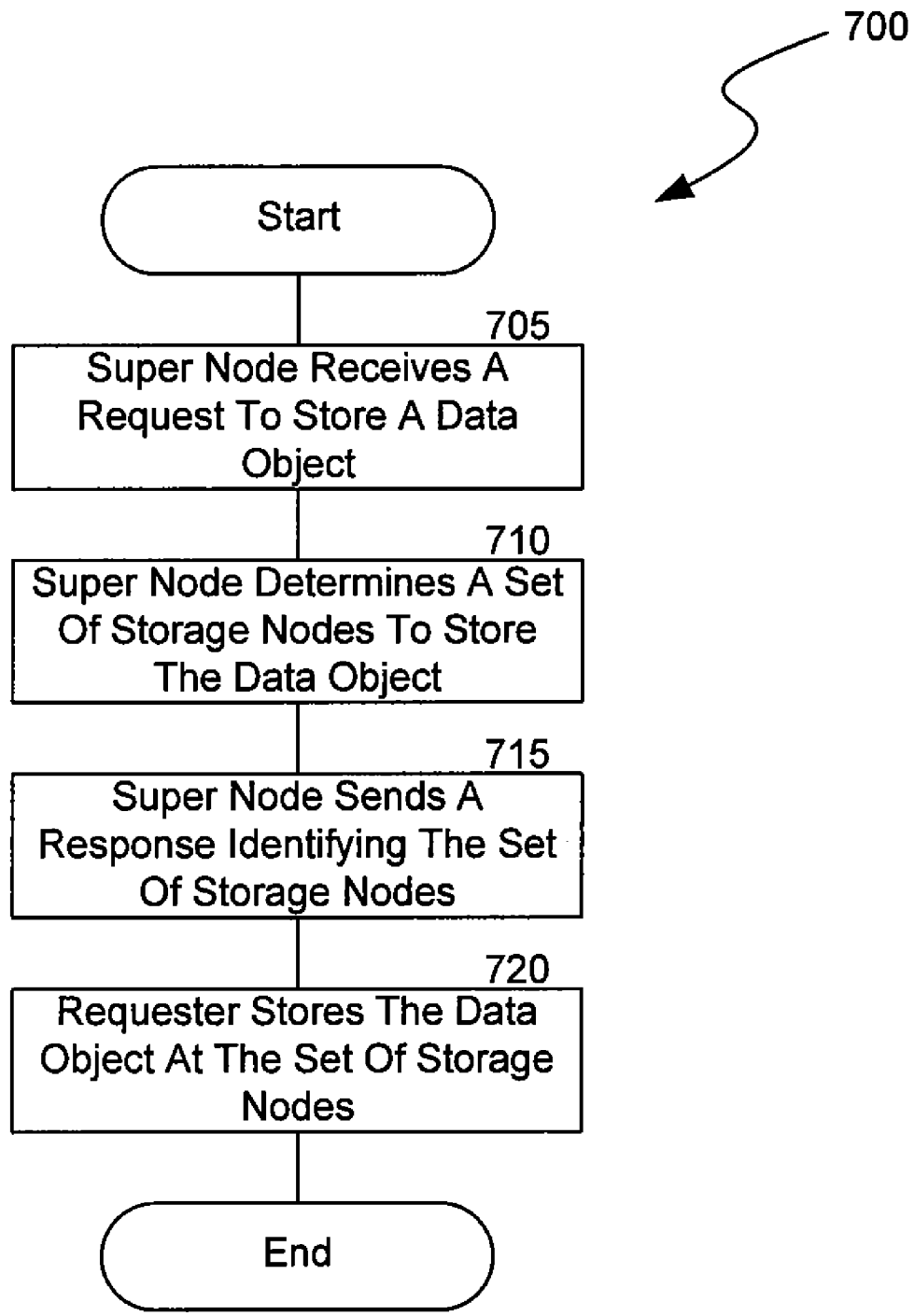
FIG. 7 is a flow chart of a process performed by the facility to store data durably within a shared community storage network.

FIG. 7 is a flow chart of a process 700 performed by the facility to store data objects durably and securely within the shared community storage network 100. To facilitate description, it is assumed that the storage node 120b is a logical mapping to a new storage device of the user contained in client device 105b, and that the storage device has been previously registered as described herein. After a storage node has joined the shared community storage network, a user may store data objects on the storage node. Such data objects may be preexisting (e.g., the user's music collection stored on client device 105b) or newly created (e.g., daily blog entries generated by the user). For example, as shown in FIG. 1, client device 105b may connect to storage node 120b via network 110 or 115b to store and retrieve data. As another example, a storage node may map to a storage component of client device 105a, in which case a network connection may not necessarily be required to store data objects on the storage node.

At least some of the data objects stored on the storage node by the user are automatically stored within shared community storage network 100 as a back-up to the primary data stored on the storage node. As described herein, such data objects may include audio files, word processing documents, videos, image files, and/or other files. The stored data objects may be expressly identified by the user or selected by the storage node based on characteristics of the stored data objects. For example, in some embodiments, the storage node may prioritize certain file types (e.g., image files) over other file types (e.g., audio files) for storage on the community storage network. Such prioritization may be based on rules established by the user. In some embodiments, the storage node may prioritize data objects based on the objects' metadata. For example, a data object that includes metadata describing a video file of the user's high-school graduation (i.e., irreplaceable data) may be prioritized over a data object that includes metadata describing a replaceable audio file.

At a block 705, a super node 125 receives a request to store a data object in the shared community storage network. The request may be received, for example, from client device 105b (referred to as the "requester"). The request may include information about the data object, such as, for example, the file name, type, size, access rights, and/or other file metadata. In some embodiments, the message sent to the appropriate super node includes a "time-to-live" parameter, which identifies the length of time that the data object is to be durably stored within the shared community storage network.

At a block 710, the super node determines a set of storage nodes at which the data object will be stored. In some embodiments, the super node determines the set of storage nodes at which the data object will be stored based on the object ID of the data object. For example, the super node may identify the set of storage nodes that have node IDs numerically closest to the object ID of the data object. The object ID may be included in the received message or generated, for example, by hashing the contents of the data object and/or its metadata.

In some embodiments, the super node consults with other super nodes to determine where the data object is to be stored. The super node may take into account a number of factors when evaluating which storage node or nodes to use, including, for example, such factors as the available contributed storage space of a storage node, the proximity of a storage node, the load of a storage node, etc.

At a block 715, the super node sends a response to the requester that identifies the set of storage nodes at which the data object is to be stored. In some embodiments, the requester encrypts the data object prior to attempting to store the data object at the identified storage nodes. Erasure encoding may also be performed prior to the data object being stored at each of the identified storage nodes. An erasure code provides redundancy without the overhead of replication. Erasure code also enables storing and retrieving data in parallel across a set of storage nodes, improving the overall throughput of the facility. Erasure codes divide an original data object into N blocks that are encoded into L fragments, where L>N. A property of erasure codes is that the original data object can be reconstructed from any N encoded fragments. Thus, a benefit of the use of erasure encoding is that each of the storage nodes only needs to store one of the L encoded fragments, which has a size significantly smaller than the original data object. Details regarding erasure encoding are known and well documented, and thus need not be described in detail in order to gain an understanding of the concepts and operation of the facility introduced herein.

At a block 720, the requester sends the data object (or the L erasure encoded fragments if erasure encoding is performed) to each of the identified storage nodes via network 110, which store the received data objects based on the parameters included in the storage request (e.g., time-to-live, etc.), and the process ends. In some embodiments, the set of storage nodes verify the accurate receipt of the data object. For example, this may be accomplished by each of the identified storage node computing the object ID (e.g. by hashing the contents of the data object and/or its metadata) and comparing the computed object ID against the received object ID. In some embodiments, each of the identified storage nodes sends a message to the requester indicating that they have received and stored the data object. The identified storage nodes may also send a similar message to each of their corresponding super nodes, which store a new metadata entry for the data object to facilitate locating the object.

Figure 8:
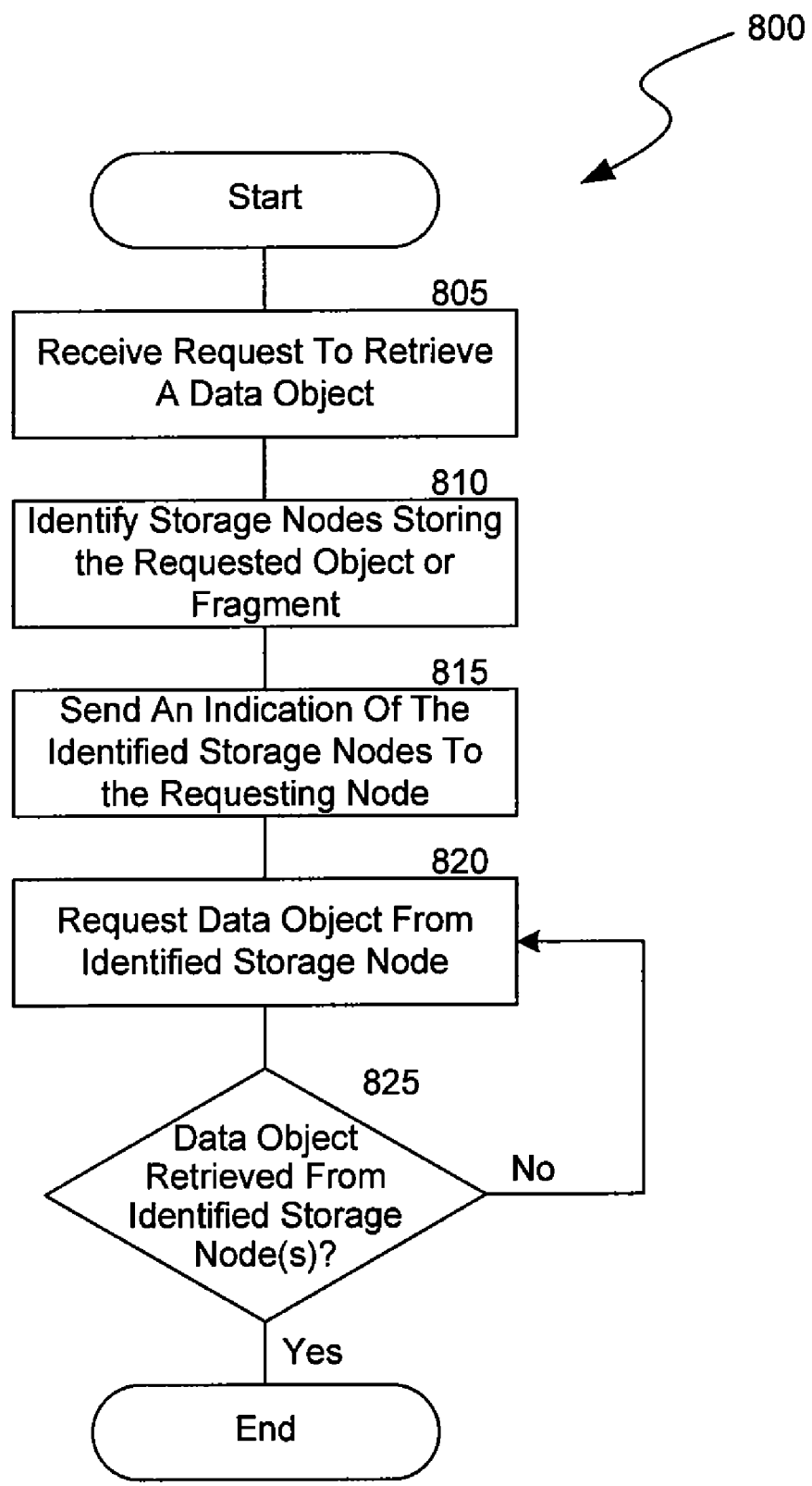
FIG. 8 is a flow chart of a process performed by the facility to retrieve data stored durably within a shared community storage network.

FIG. 8 is a flow chart of a process 800 performed by the facility in some embodiments to retrieve data that has been durably stored within the shared community storage network 100. Process 800 is performed by one or more storage nodes or clients. When connected to the shared community storage network, users may be presented with a number of interface choices, such as an interface that displays all of the data objects (e.g., files) stored within the shared community storage network that are accessible to the user by any device connected to network 110. Such data objects may be presented in a hierarchical structure, such as a directory or folder structure that may be easily navigated by the user. Such data objects may include files or folders that the user shares with other users (e.g., friends, co-workers, family, etc.).

At a block 805, a super node receives a request to retrieve a selected data object. The request received at block 805 includes the object ID associated with the selected data object. At a block 810, the super node determines the one or more storage nodes at which the data object is stored. This may be accomplished, for example, by consulting with other super nodes until a metadata entry for the data object is located. The metadata entry contains a list of storage nodes at which the data object is stored. At a block 815, the super node sends an indication of the identified one or more storage nodes to the requesting node or client device.

In some embodiments, the data object is retrieved from the storage node in closest network proximity to the requesting node or client. In some cases, the super node will locate the network address of each identified storage node in its own routing table. However, in cases where the super node cannot locate the network address of an identified storage node, it may forward a look-up query to its adjacent super nodes. The adjacent super nodes respond to the look-up query in substantially the same manner as the first-contacted super node. When the super node that manages the identified storage node receives the look-up query, it returns the network address to the requesting super node. In some embodiments, one or more algorithms are used to retrieve information across the shared community storage network 100. For example, the facility can implement different algorithms, such as a flooding algorithm or a distributed hash table (DHT) algorithm.

At a block 820, the requesting node or client requests the data object from an identified storage node. If the requesting node or client device is unable to retrieve the data object from the selected storage node at block 825, the requesting node or client continues processing at block 820 to request the data object from a different storage node at which the data object is stored. For example, the requesting node or client may continue processing at block 820 if it receives a corrupted data object or its request for such data is denied by a malicious or unavailable storage node. Those skilled in the art will appreciate that the likelihood that all of the storage nodes storing the data object (or erasure encoded fragments of the data object) are unavailable or compromised can be represented as $(m/N)^r$, where N is the total number of nodes, m is the number of unavailable or corrupt nodes, and r is the number of storage nodes at which the data object has been stored. For example, if the shared community storage network comprises a total of one-hundred thousand (100000) storage nodes, one hundred (100) of which are compromised (unavailable or corrupt), and data objects are stored redundantly at fourteen (14) storage nodes, then the probability that all of the storage nodes holding the data object are compromised is equal to $1^{-42}$. As a result, the shared community storage network is able to provide a service level guarantee to users that subscribe to its services without requiring any service level guarantee from the owners of the storage devices that form the shared community storage network. Although individual storage nodes in the community storage network may only be sporadically available, the redundancy offered by the other storage nodes ensures that data objects will be available when requested by a client device.

Figure 9:
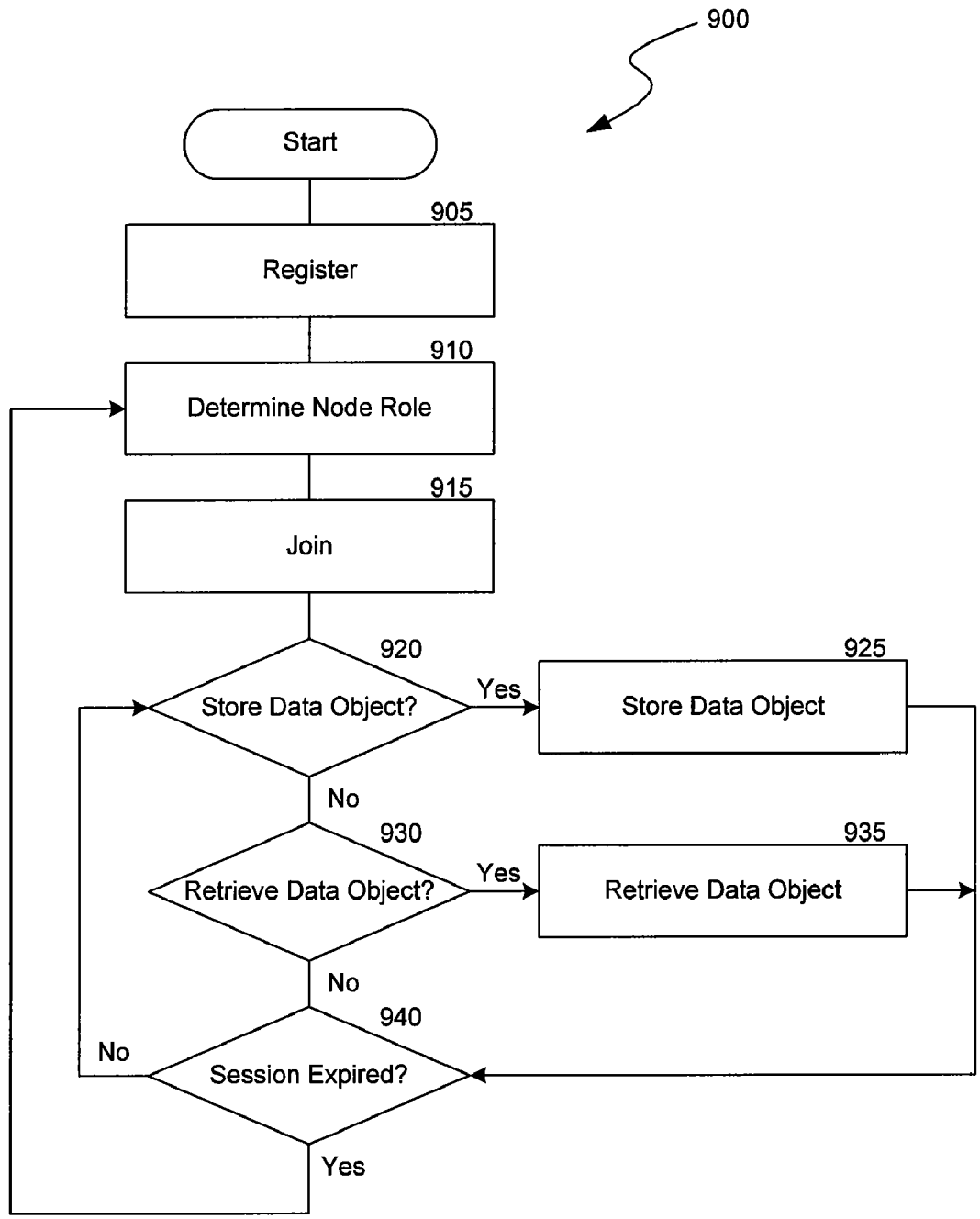
FIG. 9 is a flow chart of a process performed by a storage device that participates in a shared community storage network.

FIG. 9 is a flow chart of a process 900 performed by a storage device in one embodiment. For example, the process 900 may be performed when a storage device is powered-on and connected to a network by a user.

At a block 905, the storage device is manually or automatically registered as a storage node within a shared community storage network. The actions performed at block 905 may be similar to the process 400 described in FIG. 4. At a block 910, the role of the storage node is determined. The actions performed at block 910 may be similar to the process 500 described in FIG. 5. At a block 915, the storage node joins the shared community storage network. The actions performed at block 915 may be similar to the process 600A or 600B described in FIGS. 6A and 6B respectively.

After a storage node joins the shared community storage network, the node may store data objects, may allow stored data objects to be retrieved, or may otherwise participate in the shared community storage network. In exchange for the consumer contributing the storage node to the network, the user may be rewarded according to one or more compensation schemes. Such compensation schemes may include economic and/or non-economic incentives. As described herein, economic incentives may include, but are not limited to, periodic cash payments to the consumer, reward points that are redeemable at various retail and/or online stores, gifts, reduced-price goods and/or services, etc. Non-economic incentives offered to the consumer may include, but are not limited to, services such as the automatic back-up of consumer data that is contained in the private storage area of the storage device, customer support, additional storage space exceeding that of the storage device, etc.

Compensation schemes may be targeted at specific consumers, such as, for example, consumers having storage devices with greater than 50% storage capacity contributed to the network, storage devices connected to the network via a high-bandwidth connection, and/or storage devices that are maintained in an operational state and made accessible for over 90% of the time. The compensation schemes may be designed to encourage consumers to increase the amount of storage space that they contribute as well as improve the reliability (or up-time) of a storage node.

Returning to FIG. 9, at a block 920, if the storage node receives a request to store a data object, the storage node continues processing at a block 925. Otherwise, the storage node continues processing at a block 930. At block 925, the data object is stored at the storage node. The actions performed at block 925 may be similar to the process 700 described in FIG. 7. After block 925, the storage node continues processing at a block 940 where the storage node determines whether its session certificate has expired.

At block 930, if the storage node receives a request to retrieve a data object stored at the storage node, the storage node continues processing at a block 935. At block 935, the storage node retrieves the data object. The actions performed at block 935 may be similar to the process 800 described in FIG. 8. If there is no request to receive a data object at block 930, the storage node continues processing at block 940. At block 940, if the session certificate for the storage node has expired, the storage node continues processing at block 910. Otherwise, the processing continues at block 920.

Thus, a facility for securely and durably storing data regardless of whether any particular storage node is unavailable has been described. The facility described herein significantly reduces the likelihood that a compromised storage node will result in a loss of data. Although the shared community storage network has been referred to at times herein in the singular, it will be appreciated that many shared community storage networks may be in operation at one time. Each shared community storage network may be directed to a particular group of individuals (e.g., friends, families, companies) or each shared community storage network may be configured to have a certain number of storage nodes in each network. Although the invention has been described with reference to specific embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A storage device configured to join a network-accessible storage service comprised of a plurality of unaffiliated and un-trusted storage nodes, the storage device comprising:

a storage medium configured to store data electronically;

a network communication component configured to detect a connection with a wide area network (WAN) and further configured to send and receive data via the WAN;

a registration component coupled to the network communication component and configured to transmit a registration request across the WAN to a storage service management node, the registration request offering to make at least a portion of the storage medium accessible to the network-accessible storage service comprised of a plurality of unaffiliated and un-trusted storage nodes under terms that do not require any level of guaranteed service from the storage device to maintain the accessibility of at least the portion of the storage medium to the network-accessible storage service, the registration component being configured to receive a confirmation from the storage service management node in response to the offer to make at least a portion of the storage medium accessible being accepted by the storage service management node; and an access manager coupled to the network communication component and configured to, after the registration component receives the confirmation from the storage service management node, receive data across the WAN from a client device that utilizes the network-accessible storage service, the access manager being configured to store the received data in the storage medium, wherein the received data is encrypted prior to receipt so that the received data is not readily accessible to the host of the storage device and wherein the network-accessible storage service increases the number of unaffiliated and un-trusted storage nodes at which a data object is stored to account for increases in the number of unreliable storage nodes associated with the network-accessible storage service and decrease the probability that all of the storage nodes storing the data object are compromised.

2. The storage device of claim 1, wherein the registration request is automatically transmitted by the registration component when the network communication component detects a connection with a WAN.

3. The storage device of claim 1, wherein the registration request is transmitted by the registration component as a result of a registration process undertaken by the host of the storage device.

4. The storage device of claim 1, wherein the registration request offers to associate all of the storage medium with the network-accessible storage service.

5. The storage device of claim 1, wherein the access manager is further configured to, after the registration component receives the confirmation from the storage service management node, transmit data across the WAN to a client device that utilizes the network-accessible storage service, the transmitted data being previously stored in the storage medium in encrypted form and being transmitted in response to a read request from the client device.

6. The storage device of claim 1, wherein at least a portion of the storage medium is used to store data that is accessible to the host of the storage device.

7. The storage device of claim 6, wherein the access manager is further configured to, after the registration component receives the confirmation from the storage service management node, transmit data across the WAN to two or more of a plurality of unaffiliated storage nodes that enable the network-accessible storage service, the transmitted data being previously stored in the storage medium by the host and wherein the data is being transmitted for purposes of backing-up the data.

8. The storage device of claim 1, wherein the level of guaranteed service relates to availability.

9. The storage device of claim 1, wherein the level of guaranteed service relates to performance.

10. The storage device of claim 1, wherein the access manager further monitors a size of received data that is stored in the storage medium and periodically transmits the size to the storage service management node.

11. The storage device of claim 1, wherein the access manager further monitors a bandwidth consumed by receiving data that is stored in the storage medium, and periodically transmits the bandwidth consumed to the storage service management node.

12. The storage device of claim 1, wherein the received data represents only a portion of a data object and the other portions of the data object are stored on other unaffiliated storage nodes.

13. The storage device of claim 1, wherein the registration request further includes an identifier associated with the storage device.

14. The storage device of claim 1, wherein the registration request further includes an indication of a characteristic of the storage device.

15. The storage device of claim 14, wherein the characteristic is selected from a set consisting of processing capability, storage capability, input/output capability, connection bandwidth, and geographic location.

16. A method of joining a storage device to a network-accessible storage service comprised of a plurality of unaffiliated and un-trusted storage nodes, the method comprising:

connecting a storage device to a wide area network (WAN), the storage device including a storage medium for electronically storing data;

transmitting a registration request across the WAN to a storage service management node, the registration request offering to make at least a portion of the storage medium in the storage device with accessible to a network-accessible storage service comprised of a plurality of unaffiliated and un-trusted storage nodes under terms that do not require any level of guaranteed service from the storage device to maintain the accessibility of at least a portion of the storage medium to the network-accessible storage service when the storage device is connected to the WAN;

receiving a confirmation from the storage service management node in response to the offer to make at least a portion of the storage medium accessible being accepted by the storage service management node;

after receiving the confirmation from the storage service management node, receiving data across the WAN from a client device that utilizes the network-accessible storage service and wherein the network-accessible storage service increases the number of unaffiliated and un-trusted storage nodes at which a fragment of a data object is stored to account for increases in the number of unreliable storage nodes associated with the network-accessible storage service and decrease the probability that all of the storage nodes storing the fragment of the data object are compromised; and storing the received data in the storage medium, the received data being encrypted prior to receipt so that the received data is not readily accessible to a host of the storage device.

17. The method of claim 16, wherein the registration request is automatically transmitted when the storage device is connected to the WAN.

18. The method of claim 16, wherein the registration request is transmitted as a result of a registration process undertaken by the host of the storage device.

19. The method of claim 16, wherein the registration request offers to associate all of the storage medium with the network-accessible storage service.

20. The method of claim 16, further comprising transmitting data across the WAN to a client device that utilizes the network-accessible storage service, the transmitted data being previously stored in the storage medium in encrypted form and being transmitted in response to a read request from the client device.

21. The method of claim 16, wherein at least a portion of the storage medium is used to store data that is accessible to the host.

22. The method of claim 21, further comprising transmitting data across the WAN to two or more of a plurality of unaffiliated storage nodes that enable the network-accessible storage service, the transmitted data being previously stored in the storage medium by the host and wherein the data is being transmitted for purposes of backing-up the data.

23. The method of claim 16, wherein the level of guaranteed service relates to availability.

24. The method of claim 16, wherein the level of guaranteed service relates to performance.

25. The method of claim 16, further comprising monitoring a size of received data that is stored in the storage medium and periodically transmitting the size to the storage service management node.

26. The method of claim 16, further comprising monitoring a bandwidth consumed by receiving data that is stored in the storage medium, and periodically transmitting the bandwidth consumed to the storage service management node.

27. The method of claim 16, wherein the received data represents only a portion of a data object and the other portions of the data object are stored on other unaffiliated storage nodes.

28. The method of claim 16, wherein the registration request further includes an identifier associated with the storage device.

29. The method of claim 16, wherein the registration request further includes an indication of a characteristic of the storage device.

30. The method of claim 29, wherein the characteristic is selected from a set consisting of processing capability, storage capability, input/output capability, connection bandwidth, and geographic location.

31. A storage device including a storage medium for electronically storing data and storing instructions for performing operations comprising:
    connecting to a wide area network (WAN);
    transmitting a registration request across the WAN to a storage service management node, the registration request offering to make at least a portion of the storage medium in the storage device accessible to a network-accessible storage service comprised of a plurality of unaffiliated and un-trusted storage nodes under terms that do not require any level of guaranteed service to maintain the accessibility of at least a portion of the storage medium to the network-accessible storage service when the storage device is connected to the WAN;
    receiving a confirmation from the storage service management node in response to the offer to make at least a portion of the storage medium accessible being accepted by the storage service management node;
    after receiving the confirmation from the storage service management node, receiving data across the WAN from a client device that utilizes the network-accessible storage service and wherein the network-accessible storage service increases the number of unaffiliated and un-trusted storage nodes at which a data object is stored to account for increases in the number of unreliable storage nodes associated with the network-accessible storage service and decrease the probability that all of the storage nodes storing the data object are compromised, wherein the probability that all of the storage nodes storing the data object are compromised is calculated according to, $$\left(\frac{m}{N}\right)^r,$$

where N is the total number of storage nodes associated with the network-accessible storage service, m is the number of unavailable or corrupt nodes associated with the network-accessible storage service, and r is the number of storage nodes at which the data object has been stored; and
    storing the received data in the storage medium, the received data being encrypted prior to receipt so that the received data is not readily accessible to a host of the storage device.

* * * * *